United States Patent [19]

Ahern

[11] Patent Number: 5,711,640
[45] Date of Patent: Jan. 27, 1998

[54] WELD WIRE RECOVERY SYSTEM

[75] Inventor: Michael D. Ahern, Fond du Lac, Wis.

[73] Assignee: Harbridge, Inc., Fond du Lac, Wis.

[21] Appl. No.: 574,215

[22] Filed: Dec. 18, 1995

[51] Int. Cl.⁶ .................................................. B65G 53/26
[52] U.S. Cl. .......................... 406/117; 406/151; 406/168
[58] Field of Search .............................. 406/34, 36, 62, 406/108, 117, 145, 151, 152, 153, 154, 168, 171, 172, 173, 191, 196

[56] References Cited

U.S. PATENT DOCUMENTS

| | | | |
|---|---|---|---|
| 1,314,677 | 2/1919 | Linton | 406/42 |
| 3,332,582 | 7/1967 | Tills | 406/129 |
| 3,419,209 | 12/1968 | Munn | 406/117 X |
| 3,476,439 | 11/1969 | Homan | 406/168 X |
| 3,747,738 | 7/1973 | Greck | 406/31 |
| 5,232,315 | 8/1993 | Dugge | 406/145 |

FOREIGN PATENT DOCUMENTS

2639336  5/1990  France ............ 406/151

Primary Examiner—Andrew C. Pike
Attorney, Agent, or Firm—Donald Cayen

[57] ABSTRACT

A weld wire recovery system recovers the spent weld wire pieces from steel can bodymakers. The weld wire recovery system comprises a modular collection station installed at each bodymaker. The modular collection stations are connected via headers to a single central collection station. Each modular collection station comprises an entry fitting into which the spent pieces of weld wire drop. A primary air intake is connected to each entry fitting. An exhauster at the central collection station draws transport air into the upstream end of the primary air intake and into the entry fitting at a volume and velocity sufficient to sweep the pieces downstream through the header to a separator. A dielectric flexible connector directs the pieces from the bodymaker to the entry fitting. The flexible connector can be removed from the entry fitting for sampling the condition of the pieces. The flexible connector cooperates with a breakaway joint between the modular collection station and the header to enable a modular collection station to be removed or installed without affecting the operation of other bodymakers or the rest of the recovery system.

16 Claims, 5 Drawing Sheets

WELD WIRE RECOVERY SYSTEM

BACKGROUND OF THE INVENTION

1. Field of the Invention

This invention pertains to material handling, and more particularly to apparatus and methods for transporting small pieces of dense material.

2. Description of the Prior Art

Various equipment have been developed to pneumatically convey different materials from one location to another. The variety of materials that lend themselves to pneumatic conveyance include liquids and powders, such as are described in U.S. Pat. Nos. 3,332,582 and 4,009,912. U.S. Pat. No. 1,314,677 describes a system for conveying fine ashes. Grain is conveyed by the systems of U.S. Pat. Nos. 2,235,748 and 4,433,946. U.S. Pat. No. 3,747,738 discloses a system for handling relatively large but low density closure caps. None of the equipment of the foregoing patents is suitable for handling discrete pieces of high density material.

Removing spent copper weld wire is a necessary step in the manufacture of three-piece steel cans. The weld wire is used in the can manufacturing process as a backing strip for a welding wheel that welds the can body seams at a welding station. The high throughput rate of modern can bodymakers results in the continuous generation of the spent weld wire, which leaves the bodymaker in a long length. The spent weld wire is fed to a shears, which chops the long length into short pieces.

The weld wire is a path for electrical power to the bodymaker welding station. Consequently, the spent weld wire is under an electric potential. The electric potential is dissipated through its long length such that the potential at the shears is low. Nevertheless, care must be exercised when handling the spent weld wire.

The weld wire used in can bodymakers is very high quality copper. Accordingly, the spent chopped pieces are quite valuable. It is therefore necessary to protect them against loss.

In prior can bodymakers, the chopped pieces of spent weld wire were dropped by gravity from the shears into a waiting drum. When the drum was filled, it was manually wheeled from the bodymaker to a collection point, and a fresh drum was placed under the shears.

The prior apparatus and methods for recovering the chopped weld wire pieces were unsatisfactory. The space available for the collection drum was limited, as was the aisle space for wheeling the drums. The presence of the drum also hindered maintenance of the bodymaker. A full drum weighed between approximately 1,100 pounds and 1,500 pounds, so handling it was difficult. Tending the bodymaker was an exacting task for the operator, so handling the weld wire collection drum was an additional distraction. On the other hand, if the operator delayed in replacing a full drum, the drum would overflow. The resulting mess had to be cleaned up off the floor. There was little control over the transportation of the filled drums to the collection point, so the risk of theft was high.

On the other hand, the prior way of collecting chopped weld wire pieces did possess one desirable feature. The gravity drop of the chopped pieces from the shears to the collection drum enabled the bodymaker operator to visually inspect the chopped pieces in the drum. In that way, he could tell whether or not the shears were cutting properly.

In an attempt to solve the problems associated with manually handling pieces of spent weld wire, it is known to employ pneumatic conveyance systems for transporting the pieces away from a bodymaker. However, the prior pneumatic conveyance systems have not been satisfactory. In addition to being undesirably expensive, bulky, power consuming, and noisy, they were prone to further deform the weld wire pieces. In addition, the prior pneumatic conveyance systems had problems associated with dirt. As a result, the prior pneumatic systems should exhaust the discharge air outside the can manufacturing building.

Thus, a need exists for improvements in the transportation of pieces of spent weld wire.

SUMMARY OF THE INVENTION

In accordance with the present invention, a compact and efficient weld wire recovery system is provided that pneumatically transports small pieces of dense material from individual locations to a central location. This is accomplished by apparatus that includes one or more modular collection stations connected to a central collection station.

There is a modular collection station at each source of the pieces to be transported. The pieces are dropped by gravity into a vertically oriented inlet of an entry fitting. A horizontal inlet of the entry fitting connects to a primary air intake. The primary air intake may be a square-to-round adaptor that diverges upstream from the entry fitting.

The vertical and horizontal inlets of the entry fitting join in a mixing chamber. The mixing chamber has a throat with a cross sectional area. The area of the entrance end of the primary air intake is controlled relative to the area of the mixing chamber throat. The entry fitting mixing chamber is connected to one end of an outlet bend. The outlet bend curves vertically upward. To the second end of the outlet bend is connected the lower end of a vertical riser. The upper end of the riser is connected to a header that leads to the central collection station. The header is fabricated from commercially available pneumatic tubing.

The central collection station comprises a separator having a receiving port connected to the system header. There is a rotary valve at the bottom of the separator. A discharge port on the separator leads to an air filter, which in turn is connected to an exhauster. Downstream of the exhauster is a silencer.

The primary air intakes at the modular collection stations serve as multiple upstream ends of the weld wire recovery system. The exhauster draws transport air from the atmosphere in a downstream direction through the primary air intake and into the entry fitting of each modular collection station. A lessor amount of air is drawn through the vertical inlet of each entry fitting. The pieces of material to be collected drop by gravity from a discharge chute that is part of the source of the pieces. The pieces fall into the vertical inlet of the entry fitting. The velocity and volume of the horizontally moving transport air from the primary air intake are sufficient to sweep the pieces downstream to the mixing chamber of the entry fitting. The transport air and pieces flow together downstream through the outlet bend, riser, header, and into the separator at the central collection station. In the separator, the pieces separate out and fall to the bottom. The transport air flows out the separator to the filter, and then exhausts through the silencer.

Further in accordance with the present invention, the gravity drop of the pieces into the vertical inlet of the entry fitting is enclosed with a dielectric flexible connector. The flexible connector provides flexibility to the modular collection station such that the entry fitting vertical inlet need not be directly below the discharge chute. The flexible connector further enables the modular collection station to accommodate different size and shape discharge chutes. At the same time, the flexible connector provides access to the pieces for sampling and inspection.

It is a feature of the invention that there is a breakaway joint in the riser of each modular collection station. The combination of the riser breakaway joint and the dielectrical flexible connector between the discharge chute and the entry fitting enables easy installation and removal of a modular collection station without affecting either the source of the pieces to be collected, other modular collection stations, or the central collection station. If desired, a modular collection station can be disassembled from its associated discharge chute, and the chute can continue to discharge pieces into an alternate container in order to maintain production. The flexible connector has the additional advantage of isolating the modular collection station from any vibrations and electrical potential at the discharge chute.

The method and apparatus of the invention, using multiple modular collection stations, thus pneumatically transports small pieces of dense material from multiple sources of the pieces to a central collection station. The modular collection stations are easily disassembled from the weld wire recovery system without having to shut down the sources of the pieces in case of failure of the central collection station. Conversely, the weld wire recovery system can continue to operate if one of the sources of the pieces is taken out of production for maintenance work or other reasons.

Other advantages, benefits, and features of the present invention will become apparent to those skilled in the art upon reading the detailed description of the invention.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figures 1, 2:
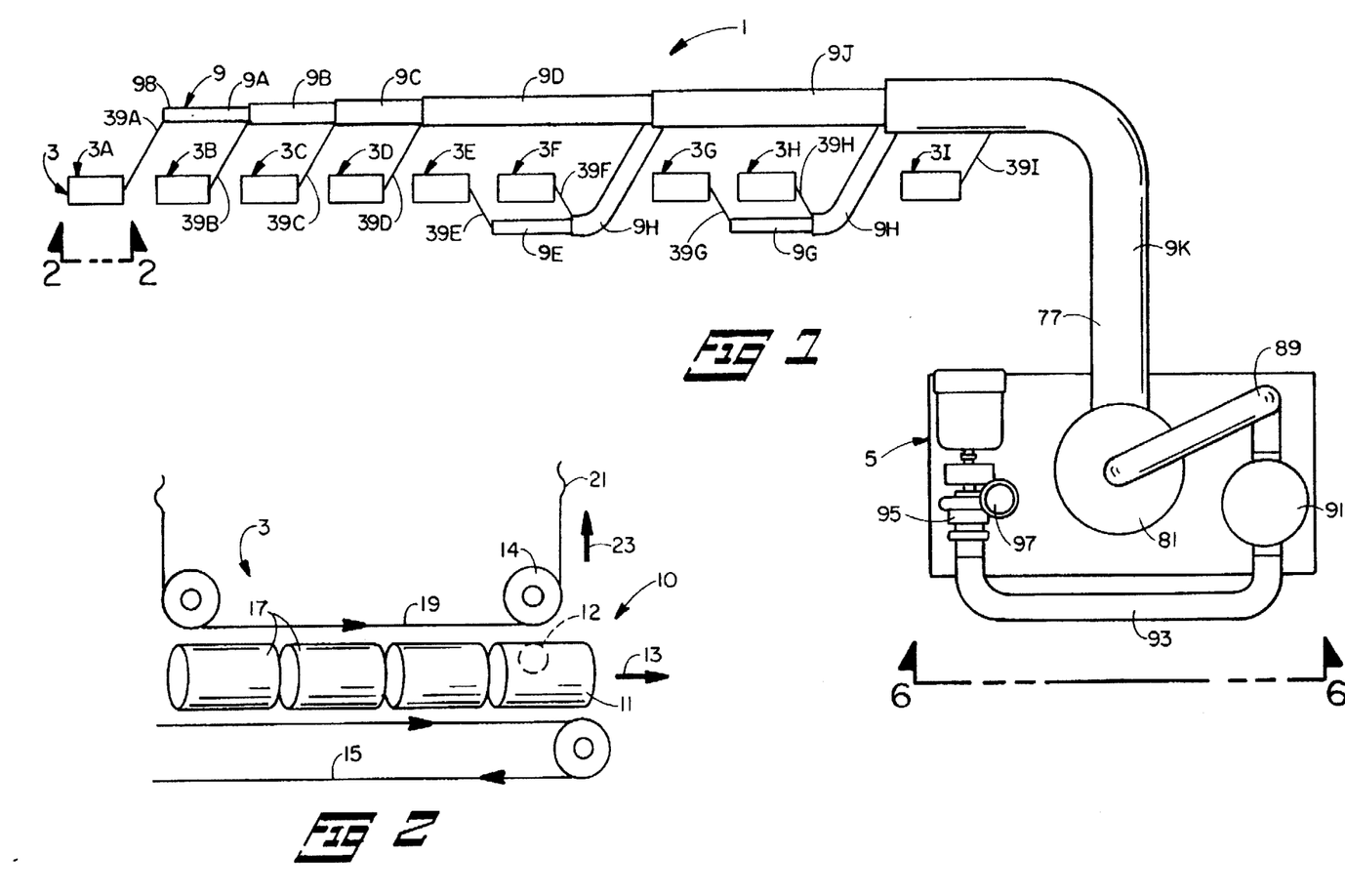
FIG. 1 is a Schematic layout of a weld wire recovery system according to the present invention.
FIG. 2 an enlarged view taken generally along line 2—2 of FIG. 1 showing a simplified schematic view of a welding station of a steel can bodymaker.

Referring to FIG. 1, a weld wire recovery system 1 is illustrated that includes the present invention. The weld wire recovery system 1 is particularly useful for transporting pieces of spent weld wire from three-piece steel can bodymakers 3. However, it will be understood that the invention is not limited to use with container manufacturing applications.

Turning to FIG. 2, a welding station 10 of an immovable can bodymaker 3 is shown in schematic form. Steel sheets for can bodies 11 are fed horizontally in a downstream direction 13 by a conveyor 15. A stationary horn 12 inside the sheets guides them downstream. A welding wheel 14 welds the sheets along seams 17 to produce the can bodies 11. To provide a mechanical support and alignment for the sheets at the welding station 10, a backing strip 19 travels in the downstream direction 13 at the same speed as the conveyor 15 and the can bodies. The backing strip 19 is a copper wire initially having a diameter of approximately 0.06 inches. The copper wire is flattened as it passes through the welding station 10. The backing strip is part of the welding gun electrical circuit, so the backing strip has an electrical voltage applied to it. The backing strip is essentially continuous, and a spent end 21 is continuously generated.

Figure 3:
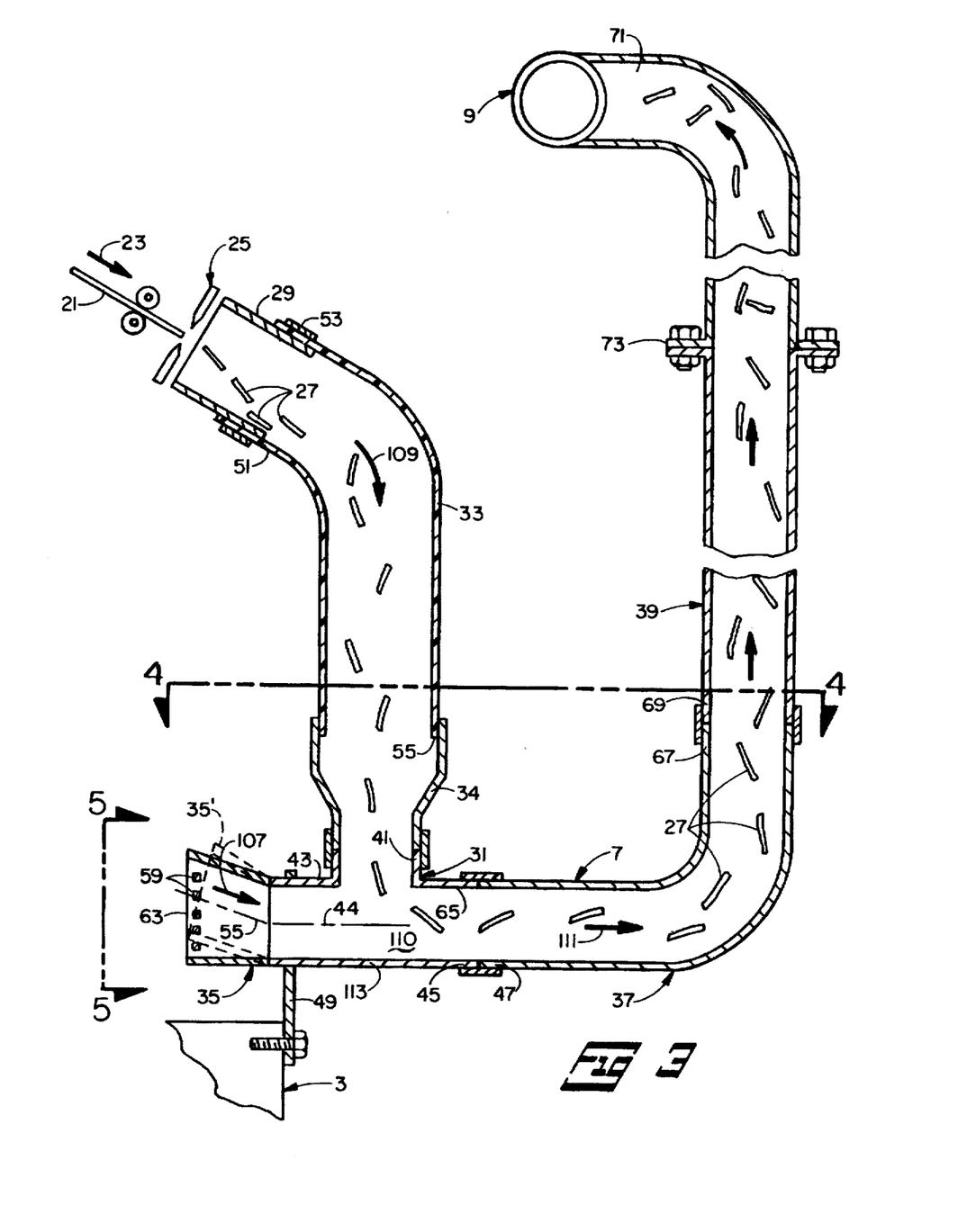
FIG. 3 is a cross sectional view on an enlarged scale of a collection station according to the present invention.
Figure 4:
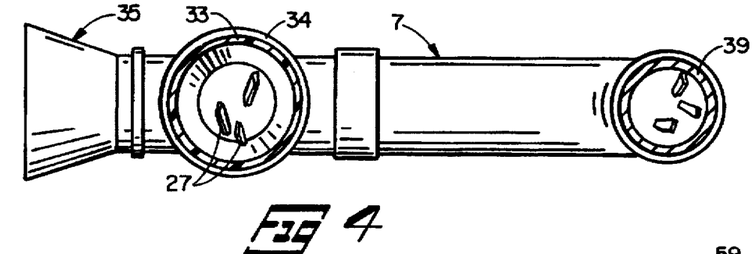
FIG. 4 is a cross sectional view taken along line 4—4 of FIG. 3.

Looking also at FIGS. 3 and 4, the spent end 21 of the weld wire backing strip 19 is fed in a downstream direction 23 to a shears schematically represented at reference numeral 25. The shears 25 cut the continuous backing strip into short discrete pieces 27 of spent weld wire. A common length for the pieces 27 is approximately one inch to 1.25 inches. From the shears, the pieces fall into a discharge chute 29. The discharge chute 29 may have different cross sectional shapes such as round, square, or rectangular, as well as different orientations to the vertical. The construction and operation of the bodymaker 3 form no part of the present invention.

The weld wire recovery system 1 of the invention is concerned with continuously transporting the chopped pieces 27 of spent weld wire away from the bodymaker 3. The weld wire recovery system is comprised of a single central collection station 5 and a number of compact modular collection stations 7. There is a modular collection station 7 for each bodymaker 3 of a can manufacturing plant. The modular collection stations are connected via a header 9 to the central collection station 5.

In FIG. 1, the weld wire recovery system 1 is shown as servicing nine bodymakers 3A–3I. However, the weld wire recovery system has the capability and flexibility to service more or fewer bodymakers.

A modular collection station 7 is located generally beneath the discharge chute 29 of each bodymaker 3. Each modular collection station is comprised of an entry fitting 31, a flexible connector 33, a primary air intake 35, an outlet bend 37, and a vertical riser 39. The entry fitting 31 has a vertically oriented inlet leg 41, a horizontal inlet leg 43, and a horizontal outlet leg 45. The horizontal inlet and outlet legs 43 and 45, respectively, are concentric about a common horizontal axis 44. The entry fitting horizontal outlet leg 45 defines an internal throat section 65. The horizontal inlet leg 43 is connected to the primary air intake 35. The horizontal outlet leg 45 is connected to the outlet bend 37. The entry fitting is mounted to any suitable part of the bodymaker 3 by a bracket 49. To accommodate the entry fitting to different bodymakers, the bracket 49 is preferably made as two adjustable pieces. If desired, the bracket 49 can be mounted to a convenient structural member of the can manufacturing plant instead of to the bodymaker.

The flexible connector 33 guides the chopped weld wire pieces 27 from the bodymaker discharge chute 29 into an adapter collar 34. Because of the possibility of the spent backing strip 21, shears 25, and discharge chute 29 being under an electrical potential, the flexible connector is made from a dielectric material. In that manner, the flexible connector electrically isolates the modular collection station 7 from the discharge chute 29. The flexible connector also mechanically isolates the modular collection station from any vibrations of the bodymaker. The flexible connector upper end 51 is clamped to the discharge chute with a clamp 53. The flexible nature of the connector material enables it to be made as a round tube and deformed by the clamp 53 to suit a noncircular discharge chute. The lower end 55 of the flexible connector is loosely fit inside the adapter collar 34. The adapter collar fits to the vertical leg 41 of the entry fitting 31.

Figure 5:
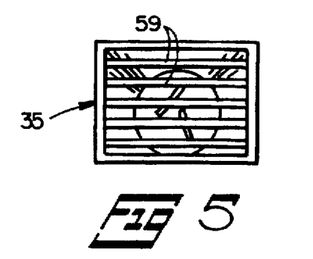
FIG. 5 is a view taken along line 5—5 of FIG. 3.

The primary air intake 35 is preferably a square-to-round adaptor, FIG. 5. The entrance end 63 of the primary air intake 35 has a relatively large area compared with the area of the entry fitting horizontal inlet leg 43. The primary air intake 35 thus provides a smooth transition from the atmosphere to the entry fitting 31. In some circumstances, it may be desirable that the centerline 55 of the primary air intake make an angle with the axis 44, as shown by phantom lines 35' in FIG. 3. To prevent loose objects from entering the primary area intake, a number of bars 59 are placed across its entrance end 63.

The inlet end 47 of the outlet bend 37 abuts the entry fitting horizontal outlet leg 45. The outlet bend curves upwardly, and its outlet end 67 abuts the lower end 69 of the riser 39. The riser upper end 71 is connected to the header 9. There is a breakaway joint 73 in the riser between its lower and upper ends 69 and 71, respectively.

The modular collection station 7 is very compact. It easily fits between the bodymaker discharge chute 29 and the storage drum that was previously used to collect the chopped pieces 27. The modular collection station does not interfere in any way with the operation of the bodymaker 3.

The header 9 connects the modular collection stations 7 to the central collection station 5 which is at a permanent location relative to the bodymarkers 3. Returning to FIG. 1, risers 39A-39I connect the respective bodymaker 9A-9I to the headers 9. The header varies in diameter from its upstream end 98 to its downstream end 77 at the central collection station 5. Specifically, the header diameter increases downstream from each bodymaker 3. The present invention is designed to use commercially available pneumatic tubing for the header. In the example of the particular system 1 of FIG. 1, the header section 9A downstream of the bodymaker 3A may have an inner diameter of 2.00 inches. The header section 9B downstream of the bodymaker 3B may have an internal diameter of 2.87 inches. The header section 9C has an internal diameter 3.37 inches, and the header section 9D downstream of the bodymaker 3D has an internal diameter of 3.87 inches.

To keep the air volume to a minimum while using commercially available pneumatic tubing, the header sections 9E and 9F for the bodymakers 3E and 3F, respectively, are in a parallel branch to the header sections 9A-9D. The header section 9E has an inner diameter of 2.00 inches, and the header section 9F has an inner diameter of 2..7 inches. The header section 9J has an inner diameter of 4.87 inches. Another parallel branch consisting of header sections 9G and 9H serve the bodymakers 3G and 3H, respectively. The header section 9G has an inner diameter of 2.00 inches, and the header section 9H has an inner diameter of three inches. The header section 9K downstream of the header section 9J has an inner diameter of 5.87 inches. The bodymaker 3I is connected directly by its riser 39I to the header section 9K. The combination of series-parallel connections of the bodymakers 3A-3I to the multi-diameter header 9 provides the outstanding benefits of being able to use commercially available pneumatic tubing and of requiring only minimum transport air volume with the attendant low horsepower requirement.

The downstream end 77 of the header 9 is connected to a receiving port 79 of a separator 81. Looking also at FIG. 6, there is a discharge port 85 at the top of the separator 81. A rotary valve 87 is located at the bottom of the separator. A duct 89 leads from the separator discharge port 85 to a filter 91. Another duct 93 leads from the filter 91 to an exhauster 95. A silencer 97 is attached to the outlet side of the exhauster 95.

Figure 6:
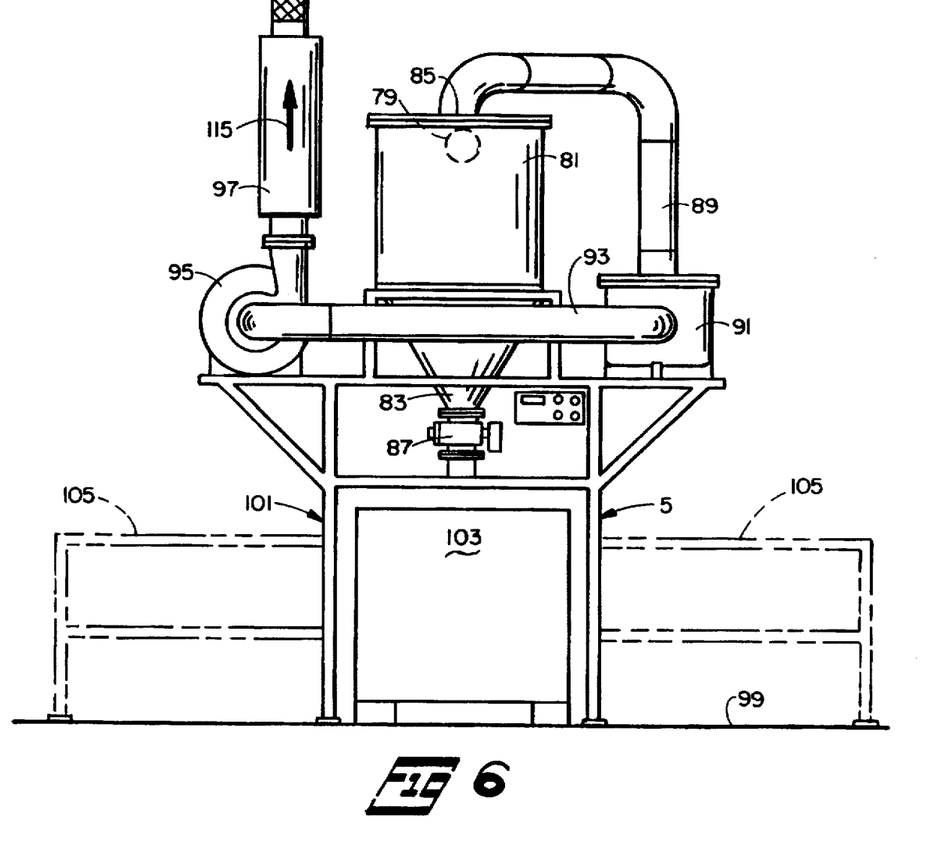
FIG. 6 is an enlarged view taken along line 6—6 of FIG. 1.

It is a feature of the present invention that the central collection station 5 occupies a minimal footprint on the floor 99 of the can manufacturing plant. The separator 81, filter 91, and exhauster 95 are mounted several feet above the plant floor 99 on a wing platform 101. A scrap barrel 103 is placed within the wing platform 101 under the separator rotary valve 87. If desired, a security fence, typically represented by phantom lines 105, can be installed around the wing platform and the scrap barrel 103.

In operation, the exhauster 95 is energized to draw air through the filter 91, duct 89, separator 81, and header 9. Accordingly, transport air enters the primary air intake 35 of each modular collection station 7, as is indicated by arrow 107. The transport air 107 flows in a downstream direction into the associated entry fitting 31. A smaller amount of air flows through the flexible connector 33 into the entry fitting, as is represented arrow 109 of FIG. 3. Chopped pieces 27 of the spent weld wire 21 drop with the air flow 109 into each entry fitting. The two air flows 107 and 109 and the pieces 27 join and mix at a mixing chamber 110 located near the throat section 65 of the entry fitting horizontal outlet leg 45. The area of the primary air intake opening 63 and the size of the exhauster and header are set such that the transport air 107 has sufficient velocity and volume to sweep the pieces in the downstream direction, as indicated by arrow 111, before they can reach the bottom portion 113 of the entry fitting. In fact, when viewed from the entrance 63 in the primary air intake 35, the pieces 27 appear to dance in midair in the mixing chamber. The actual velocity and volume of the transport air varies with the diameter of the header sections 9A-9K, the size of the pieces, and the divergence of the primary air intake 35. To produce the required air velocity and volume in the mixing chamber, the weld wire recovery system 1 requires that the area of the entrance end 63 of the primary air intake be at least about 1.5 times the area of the entry fitting throat section 65.

The air flows 111 of all the modular collection stations transport the pieces 27 around their respective outlet bends 37 into the risers 39 and through the header 9 to the separator 81. In the separator, the pieces fall from the air stream to the bottom of the separator. The valve 87 discharges the pieces to fall from the separator into the waiting barrel 103. In that manner, the weld wire pieces are continuously transported from the bodymakers 3 to the central collection station 5 and into the barrel 103 without action by the bodymaker operator or other personnel.

Further in accordance with the present invention, the modular collection stations 7 are very compact. For example, the inner diameter of the entry fitting throat area 65 is only about two inches. The total length of the entry fitting 31 is approximately five inches. The length of the primary air intake 35 is approximately three inches. Accordingly, the modular collection station occupies minimal space on the bodymaker 3.

The modular nature of the collection stations 7 is another very important feature of the present invention. It is highly important that the bodymakers 3 operate continuously. Consequently, the weld wire recovery system 1 must be installed in a manner that does not interfere with the production of the bodymakers. Such installation is achieved by the flexible connectors 33 and the riser breakaway joints 73. During installation of the weld wire recovery system, the header 9 and central collection station 5 can be installed in the can manufacturing plant up to the riser breakaway joints with minimal effect on the bodymakers. That is, during system installation, the chopped weld wire pieces 27 can continue to be collected in the conventional drums placed under the discharge chutes 29. When the header 9 is in place, the upper end 51 of each flexible connector is clamped by the clamp 53 to the associated bodymaker discharge chute. The flexible connectors are bent such that they direct the pieces 27 falling from the discharge chutes into the associated collection drums. Each modular collection station is attached to the appropriate header section by the riser breakaway joint and to the bodymaker by the bracket 49. The small size and light weight of the modular collection stations enable them to be handled easily. When all the modular collection stations are properly in place, the exhauster 95 is energized. The lower ends 55 of the flexible connectors are inserted into their associated collars 34. The pieces 27 are then drawn into the modular collection stations, and the weld wire recovery system is operative without having any effect on the operation of the bodymakers.

Figure 8:
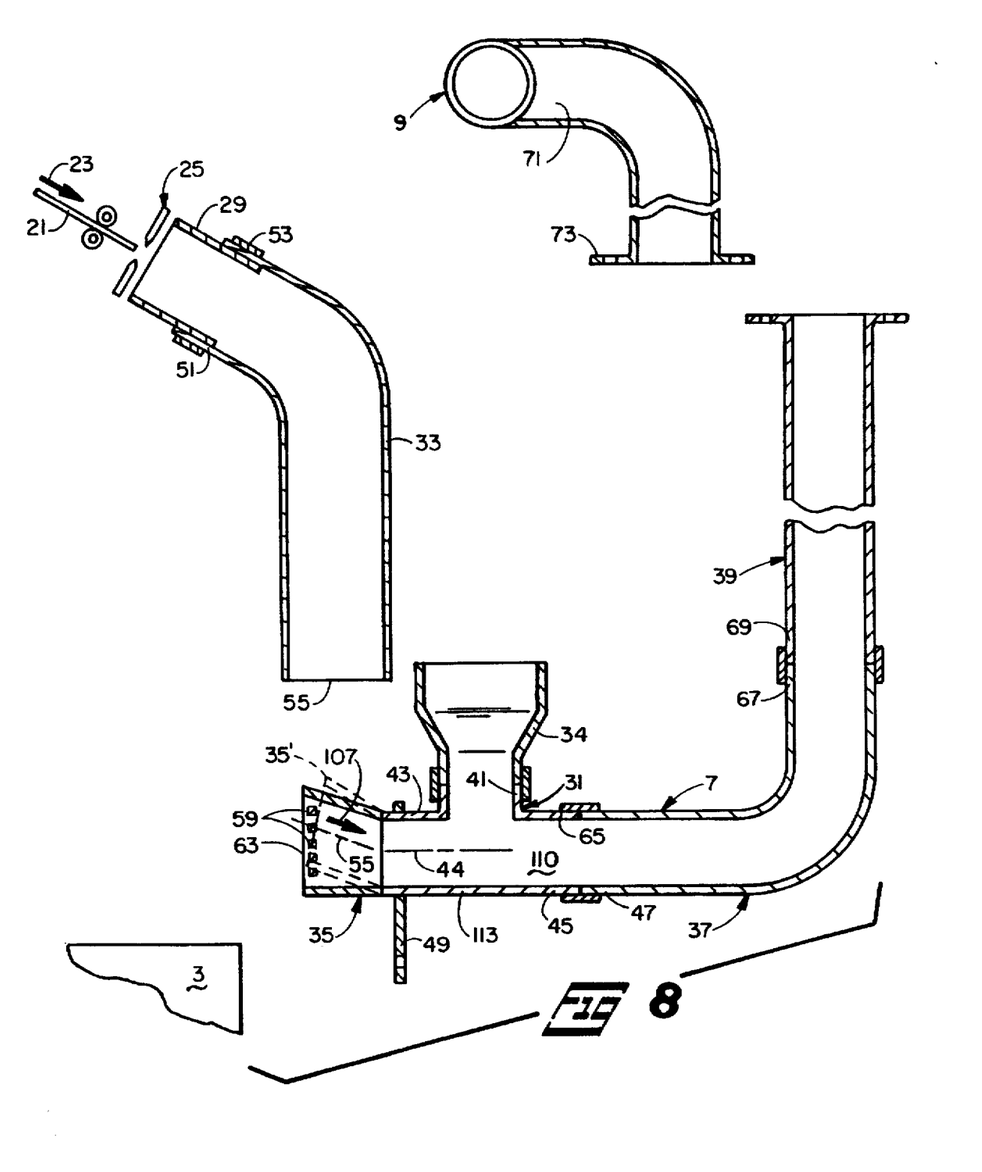
FIG. 8 is a view similar to FIG. 3, but showing the modular collection station removed from the bodymaker and the header.
Figure 9:
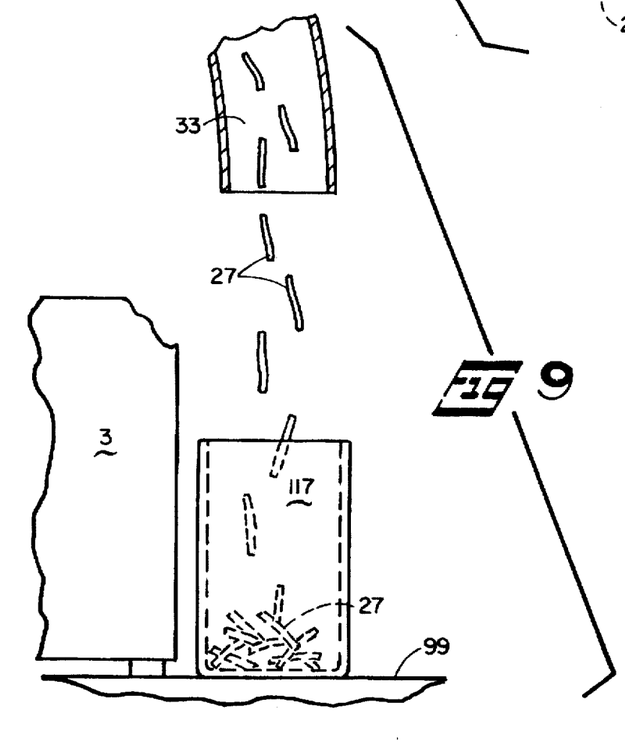
FIG. 9 is a simplified view in which the modular collection station is removed from a bodymaker, and the bodymaker discharges weld wire pieces directly into a drum.

Conversely, if a malfunction or maintenance problem occurs in the weld wire recovery system 1, the bodymakers 3 need not stop production. Rather, the lower ends 55 of the flexible connectors 33 of the affected modular collection stations 7 are merely pulled out of their associated collars 34. Conventional drums 117 are placed beneath the flexible connectors to collect the chopped pieces 27, FIG. 9. If necessary, one or more modular collection stations can be removed from and replaced on the bodymaker by the bracket 49 and breakaway joint 73 without affecting either the bodymaker or the rest of the weld wire recovery system, FIG. 8. Thus, the weld wire recovery system, while highly important and beneficial, is nevertheless expendable, at least temporarily, to the operation of the bodymakers. Further, the modular nature of the weld wire recovery system, together with the compact size of the modular collection stations, makes it ideal for retrofitting pre-existing bodymakers.

Figure 7:
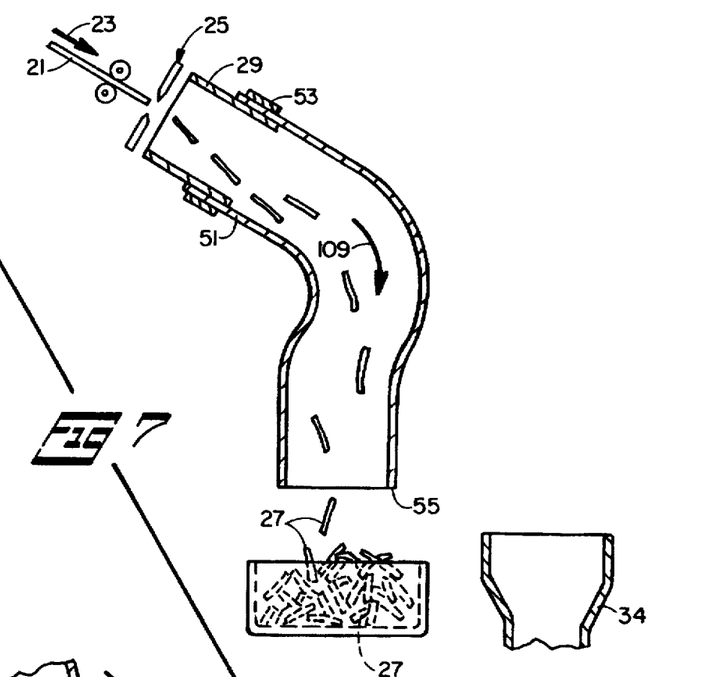
FIG. 7 is a view on a reduced scale showing the flexible connector pulled out of the air inlet fitting for inspecting spent weld wire pieces.

The versatility of the present invention is further demonstrated by the fact that even when the weld wire recovery system 1 is operating as intended, the bodymaker operator can easily check the status of the shears 25. To do so, the operator merely pulls the flexible connector lower end 55 out of the collar 34 and allows some pieces 27 to be collected, FIG. 7. He then replaces the flexible connector 33. After visually inspecting the pieces, the operator can take appropriate steps, if required, to service the shears.

It will be noticed from FIGS. 1 and 6 that the exhauster 95 is downstream of the separator 81 and the filter 91. It is important that no pieces 27 enter the exhauster, which would damage the exhauster and create intolerable noise. Moreover, the placement of the filter upstream from the exhauster protects the exhauster and enables the discharge air 115 to vent inside the manufacturing plant.

In summary, the results and advantages of three-piece steel can bodymakers 3 can now be more fully realized. The weld wire recovery system 1 provides for both the transportation of spent weld wire pieces 27 from individual bodymakers and for collection of the pieces from multiple bodymakers at a central station. This desirable result comes from using the combined functions of the modular collection stations 7. The vertical leg 41 of the entry fitting 31 directs spent weld wire pieces to an airstream 107 that sweeps the pieces in a downstream direction to the central collection station 5. The central collection station serves as both the source of the transport air and a temporary storage location for the pieces. The central collection station can handle multiple bodymakers and modular collection stations. The modular collection stations are compact, and their flexible connectors 33 and breakaway joints 73 enable them to be installed and removed from a bodymaker without affecting bodymaker production. The flexible connector further enables easy periodic inspection of the spent weld wire pieces.

It will also be recognized that in addition to the superior performance of the present invention, its construction is such as to be of modest cost relative to the benefits it provides to the can manufacturing process. Its compact size, ability to use commercially available pneumatic tubing, and low transport air flow and operating costs are outstanding benefits. Also, its versatility enables can bodymakers to operate in a normal manner both during and after installation of the weld wire recovery system.

Thus, it is apparent that there has been provided, in accordance with the invention, a weld wire recovery system that fully satisfies the aims and advantages set forth above. While the invention has been described in conjunction with specific embodiments thereof, it is evident that many alternatives, modifications, and variations as to sizes and shapes will be apparent to those skilled in the art in light of the foregoing description. Accordingly, it is intended to embrace all such alternatives, modifications, and variations as fall within the spirit and broad scope of the appended claims.

I claim:

1. A weld wire recovery system for continuously transporting spent weld wire pieces that are continuously produced from an immovable source comprising:

(a) at least one compact modular collection station removably mounted to the source of spent weld wire pieces comprising:
  (i) an entry fitting having a non-closeable vertical inlet, a horizontal inlet, and a horizontal outlet concentric with the horizontal inlet;
  (ii) connector means for directing the spent weld wire pieces from the source immediately subsequent to production thereof into the vertical inlet of the entry fitting;
  (iii) air intake means joined to the entry fitting horizontal inlet for continuously directing transport air into the entry fitting during the production of the spent weld wire pieces; and
  (iv) riser means for directing the spent weld wire pieces in a downstream direction from the entry fitting horizontal outlet of only one said source;

(b) header means for directing the spent weld wire pieces in the downstream direction from the riser means; and (c) a central collection station at a permanent location relative to the source of the weld wire pieces comprising:

(i) exhauster means for continuously drawing the transport air into the air intake means and through the entry fitting horizontal inlet at a sufficient velocity and volume to sweep the spent weld wire pieces directed to the entry fitting vertical inlet solely by the transport air in the downstream direction and out of the entry fitting horizontal outlet and through the header means; and (ii) separator means interposed between the exhauster means and the header means for separating the spent weld wire pieces from the transport air.

2. The weld wire recovery system of claim 1 wherein:

(a) there are a plurality of sources of spent weld wire pieces;

(b) there is one said modular collection station associated with each source of spent weld wire pieces;

(c) the header means directs the spent weld wire pieces from each of the modular collection stations directly to the central collection station;

(d) the sources of spent weld wire pieces are connected to the header means in a series-parallel arrangement; and (e) the header means comprises a plurality of header sections of differing diameters and made of commercially available pneumatic tubing, each header section being respectively connected to one of the sources of spent weld wire pieces, so that minimum transport air volume is required to sweep the spent weld wire pieces from the sources thereof to the central collection station.

3. A weld wire recovery system for transporting spent weld wire pieces from a source thereof comprising:

at least one compact modular collection station comprising:

(i) an entry fitting having a vertical inlet, a horizontal inlet, and a horizontal outlet;

(ii) connector means for directing the spent weld wire pieces from the source thereof into the vertical inlet of the entry fitting, wherein the connector means comprises a dielectric flexible connector having a first end clamped to the source of the spent weld wire pieces and a second end removably inserted into the vertical inlet of the entry fitting;

(iii) air intake means joined to the entry fitting horizontal inlet for directing transport air into the entry fitting; and (iv) riser means for directing the spent weld wire pieces in a downstream direction from the entry fitting horizontal outlet;

(b) header means for directing the spent weld wire pieces in the downstream direction from the riser means; and (c) a central collection station comprising:

(i) exhauster means for drawing the transport air into the air intake means and through the entry fitting horizontal inlet at a sufficient velocity and volume to sweep the spent weld wire pieces directed to the entry fitting vertical inlet in the downstream direction and out of the entry fitting horizontal outlet and through the header means; and (ii) separator means interposed between the exhauster means and the header means for separating the spent weld wire pieces from the transport air.

4. A weld wire recovery system for transporting spent weld wire pieces from a source thereof comprising:

(a) at least one compact modular collection station comprising:

(i) an entry fitting having a vertical inlet, a horizontal inlet, and a horizontal outlet;

(ii) connector means for directing the spent weld wire pieces from the source thereof into the vertical inlet of the entry fitting;

(iii) air intake means joined to the entry fitting horizontal inlet for directing transport air into the entry fitting, wherein the air intake means comprises a square-to-round adaptor having a round downstream end connected to the entry fitting horizontal inlet and a rectangular entrance end; and (iv) riser means for directing the spent weld wire pieces in a downstream direction from the entry fitting horizontal outlet;

(b) header means for directing the spent weld wire pieces in the downstream direction from the riser means; and (c) a central collection station comprising:

(i) exhauster means for drawing the transport air into the air intake means and through the entry fitting horizontal inlet at a sufficient velocity and volume to sweep the spent weld wire pieces directed to the entry fitting vertical inlet in the downstream direction and out of the entry fitting horizontal outlet and through the header means; and (ii) separator means interposed between the exhauster means and the header means for separating the spent weld wire pieces from the transport air.

5. The weld wire recovery system of claim 4 wherein:

(a) the entry fitting has a throat section with a predetermined area; and (b) the entrance end of the air intake means defines an area that is at least about 1.5 times the area of the entry fitting throat section.

6. A weld wire recovery system for transporting spent weld wire pieces from a source thereof comprising:

(a) at least one compact modular collection station comprising:

(i) an entry fitting having a vertical inlet, a horizontal inlet, and a horizontal outlet;

(ii) connector means for directing the spent weld wire pieces from the source thereof into the vertical inlet of the entry fitting;

(iii) air intake means joined to the entry fitting horizontal inlet for directing transport air into the entry fitting;

(iv) riser means for directing the spent weld wire pieces in a downstream direction from the entry fitting horizontal outlet; and (v) bracket means for mounting the entry fitting to the source of the spent weld wire pieces;

(b) header means for directing the spent weld wire pieces in the downstream direction from the riser means, wherein:

the riser means comprises:

an outlet bend having a horizontal upstream end connected to the horizontal outlet of the entry fitting, and a vertical downstream end;

a riser having a lower end connected to the vertical end of the outlet bend, and an upper end connected to the header means; and a breakaway joint between the riser lower and upper ends that cooperates with the bracket means to enable the modular collection station to be installed and removed from the source of the spent weld wire pieces and the header means without effect on the source of the spent weld wire pieces or on the header means; and (c) a central collection station comprising:

(i) exhauster means for drawing the transport air into the air intake means and through the entry fitting horizontal inlet at a sufficient velocity and volume to sweep the spent weld wire pieces directed to the entry fitting vertical inlet in the downstream direction and out of the entry fitting horizontal outlet and through the header means; and (ii) separator means interposed between the exhauster means and the header means for separating the spent weld wire pieces from the transport air.

7. Apparatus for pneumatically transporting small pieces of dense material from a source thereof comprising:

(a) connector means for directing the pieces away from the source thereof;

(b) entry means for receiving the pieces from the connector means and transport air from the atmosphere;

(c) header means for directing the transport air and the pieces in a downstream direction from the entry means;

(d) separator means connected to the header means for separating the pieces from the transport air; and (e) exhauster means connected to the separator means for creating the transport air, wherein the connector means comprises a dielectric flexible connector having a first end clamped to the source of the pieces and a second end loosely received in the entry means, so that the transport air transports the pieces from the entry means to the separator means.

8. The apparatus of claim 7 wherein the entry means is connected to the header means with a breakaway joint that cooperates with the flexible connector to enable the entry means to be quickly installed and removed from between the source of the pieces and the header means.

9. A method of recovering pieces of spent weld wire from a steel can bodymaker inside a building comprising the steps of:

(a) vertically dropping the pieces from the bodymaker;

(b) directing the pieces into an entry fitting, wherein the step of directing the pieces into the entry fitting comprises the steps of:

(i) clamping a first end of a dielectric flexible connector to the bodymaker;

(ii) loosely inserting a second end of the flexible connector into the entry fitting; and (iii) directing the pieces from the bodymaker to the entry fitting with the flexible connector;

(c) drawing transport air directly from the atmosphere into the entry fitting;

(d) sweeping the pieces in the entry fitting in a downstream direction with the transport air; and (e) separating the pieces from the transport air.

10. The method of claim 9 comprising the further steps of:

(a) removing the second end of the flexible connector from the entry fitting; and (b) sampling pieces dropped from the bodymaker and directed by the flexible connector.

11. The method of claim 9 wherein the step of sweeping the pieces in the entry fitting in the downstream direction comprises the steps of:

(a) mounting the entry fitting to the bodymaker;

(b) connecting an upstream end of a riser to the entry fitting;

(c) connecting a downstream end of the riser to a header;

(d) providing a breakaway joint in the riser between the upstream and downstream ends thereof;

(e) connecting the header to a separator; and (f) removing the entry fitting from the bodymaker, removing the second end of the flexible connector from the entry fitting, and disconnecting the breakaway joint and thereby removing the entry fitting as a module from the bodymaker and the header.

12. The method of claim 9 wherein the step of separating the pieces from the transport air comprises the steps of:

(a) drawing the pieces and the transport air to a separator;

(b) separating the pieces from the transport air inside the separator; and (c) venting the transport air inside the building.

13. A method of recovering spent weld wire pieces from a plurality of steel can bodymakers inside a building comprising the steps of:

(a) mounting a modular collection station to each bodymaker including the step of mounting an entry fitting to each bodymaker;

(b) providing a central collection station;

(c) providing a header leading from the modular collection stations to the central collection station;

(d) dropping the pieces from each bodymaker vertically into the respective modular collection station including the step of dropping the pieces into a vertical inlet of each respective entry fitting, wherein the step of dropping the pieces from each bodymaker comprises the further steps of:

(i) clamping a first end of a dielectric flexible connector to the bodymaker;

(ii) loosely inserting a second end of the flexible connector into the entry fitting; and (iii) directing the pieces from the bodymaker to the entry fitting with the flexible connector;

(e) drawing transport air from the atmosphere into each of the modular collection stations including the step of drawing the transport air into a horizontal inlet of each entry fitting; and (f) transporting the pieces from the modular collection stations through the header to the central collection station with the transport air including the step of sweeping the pieces from the vertical inlet with the transport air at a first predetermined velocity and to the header and to the central collection station.

14. The method of claim 13 comprising the further steps of:

(a) connecting a riser to the entry fitting of each modular collection station;

(b) connecting the riser associated with each entry fitting to the header;

(c) providing a breakaway joint in each riser;

(d) disconnecting the breakaway joint between a selected modular collection station and the header;

(e) removing the second end of the flexible connector from the entry fitting of the selected modular collection station; and (f) removing the entry fitting of the selected modular collection station from the associated bodymaker and thereby removing the selected modular collection station from the associated bodymaker and the header without disturbing the modular collection stations of the other bodymakers or the central collection station.

15. The method of claim 13 comprising the further steps of:
   (a) removing the second end of the flexible connector from the entry fitting mounted to a selected bodymaker; and
   (b) sampling pieces dropped from the selected bodymaker and directed by the flexible connector.

16. The method of claim 13 comprising the further steps of:
   (a) removing the second end of the flexible connector from the entry fitting mounted to a selected bodymaker; and
   (b) directing the pieces dropped from the selected bodymaker through the flexible connector into a drum,
   so that the selected bodymaker can continue production if the central collection station fails.

* * * * *